Aug. 15, 1939. J. C. HEWITT, JR., ET AL 2,169,342
WELL SURVEYING INSTRUMENT
Filed April 14, 1936
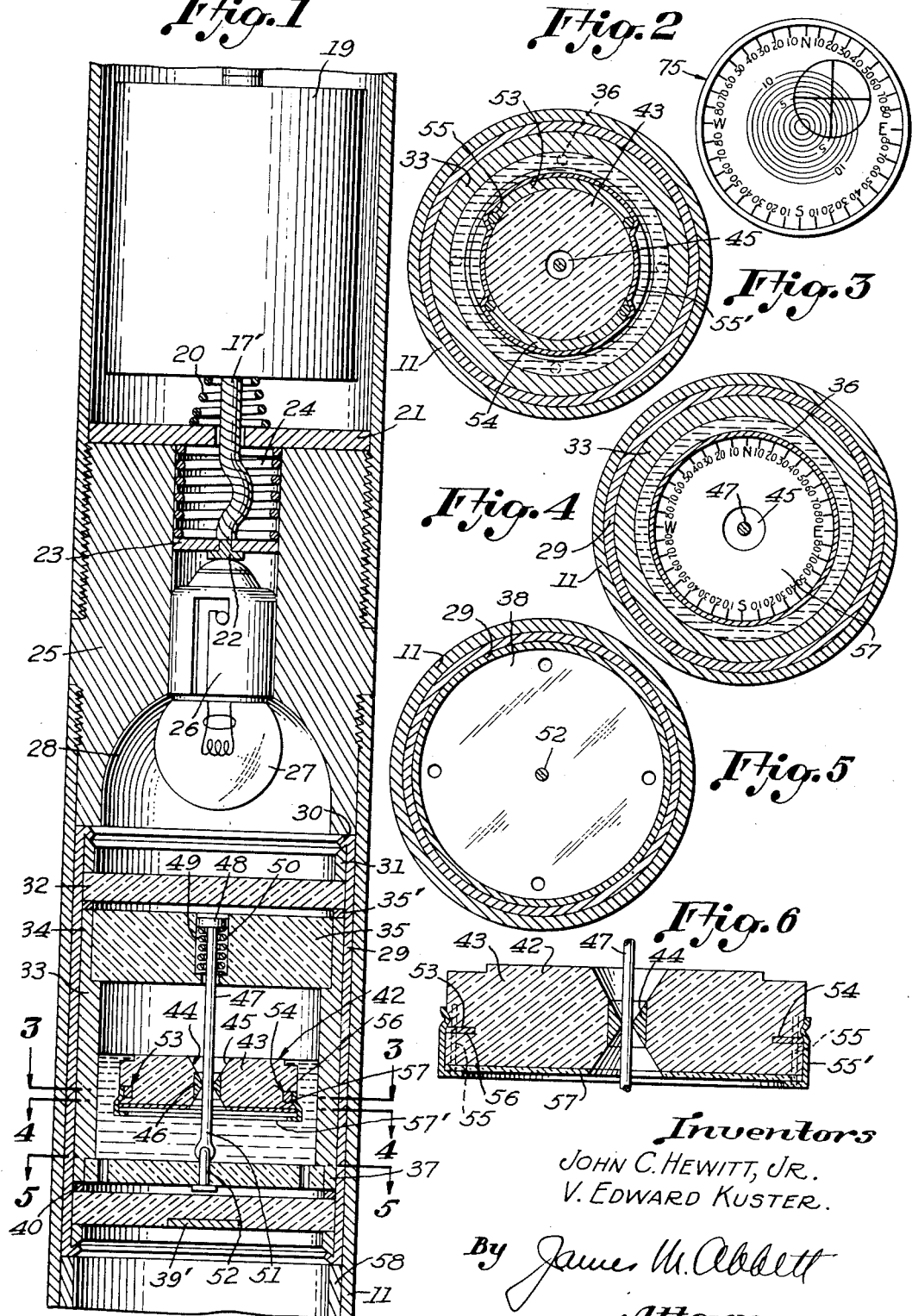
Inventors
JOHN C. HEWITT, JR.
V. EDWARD KUSTER.
By James M. Abbott
Attorney.

UNITED STATES PATENT OFFICE 2,169,342

WELL SURVEYING INSTRUMENT

John C. Hewitt, Jr., and Vivian Edward Kuster, Long Beach, Calif.

Application April 14, 1936, Serial No. 74,320

3 Claims. (Cl. 33—223)

This invention relates to compass structure for a well surveying instrument and particularly pertains to the magnetic type.

Well surveying instruments have heretofore been used in determining the declination of a bore hole of a well. These instruments have in some instances utilized a magnetic compass to determine the direction of the deviation of the bore hole from the vertical and have also been provided with photographic equipment whereby a permanent photographic record may be made indicating the deviation at the point of its measurement. The success of such an instrument is dependent upon its accuracy, and since the photographic image must be created by artificial illumination it is apparent that the accuracy of the instrument will be in part dependent upon the clearness of the image recorded within the instrument and retained upon the photographic plate or film which is used. Such results have heretofore been hampered due to the small size of the instrument which must necessarily be lowered into the well.

In declination instruments of the photographic type, it is necessary to illuminate the compass card brightly so that the necessary photographic record may be made. This has been difficult to accomplish since the diameter of the entire structure as lowered into the well must of necessity be relatively small. In some types of instruments small delicate electric light bulbs have been used which would project a direct beam of light to the compass card. Such construction is quite expensive to build and to maintain in operative condition. In an effort to obtain a greater degree of illumination one of the present inventors devised the indirect method of illumination shown in his co-pending application, entitled Method and means for measuring well declinations, filed May 18, 1935, Serial No. 21,829, now Patent 2,116,350, granted May 3, 1938, where it will be seen that a series of light bulbs are used and project a beam of light to the compass card from an area surrounding the opening through which the photographic exposure is made. This has made it possible to increase the degree of illumination but the cross sectional dimension of the instrument is such as to limit the size and number of these bulbs. In the present case a greater degree of illumination is obtained for the compass card than in most instruments now known, since a relatively large light bulb is used which may be disposed centrally of the instrument and may occupy any desired amount of the space within the instrument. The light bulb will direct a strong beam of light to the compass card and directly illuminate it, and since the source of light is on the opposite side of the compass card from the photographic lens a well defined photographic record will be made and will insure that a highly efficient instrument may be incorporated within a case of small diameter. It is the principal object of the present invention therefore to provide a compass structure for a well surveying instrument of the magnetic type in which proper illumination is obtained to create a beam of light of sufficient magnitude and intensity such as to insure that the photographic image recorded will clearly and accurately indicate the reading desired.

The present invention is used in connection with a well surveying instrument having a barrel of considerable length, and within which illuminating means are provided to project a strong beam of light the length of the barrel. The barrel contains a magnetic compass which is substantially transparent throughout whereby a beam of light may be projected upon the compass card from the side opposite to a photographic lens for recording the reading of the compass and the direction of declination in a clear-cut image which may be accurately read.

The invention is illustrated by way of example in the accompanying drawing in which:

Fig. 1 is a view in horizontal section disclosing the illuminating and float compass unit in which the present invention is concerned.

Fig. 2 is a view in elevation showing the complete photographic record obtained by the use of this instrument.

Fig. 3 is a view in transverse section through the compass float unit as seen on the line 3—3 of Fig. 1 and shows the means for holding the float needles in orientation with the float proper.

Fig. 4 is a view in transverse section as seen on the line 4—4 of Fig. 1, showing the position of the compass float card, which in this instance is translucent.

Fig. 5 is a view in transverse section through the structure as seen on the line 5—5 of Fig. 1 and shows the holes provided to prevent bubbles in the fluid between the compass card and the photographic lens.

Fig. 6 is an enlarged fragmentary view showing the details of the compass construction.

Referring more particularly to the drawing, 10 indicates the assembled well surveying instrument with which the present invention is concerned. It is to be understood that the structure as shown in Fig. 1 might be lowered into an empty or dry well and that when placed in a protective casing may be lowered into a well filled with fluid. In either event the structure provided is to survey the well and ascertain its deviation from the vertical. Generally considered the surveying structure as a whole comprises an illuminating unit, a photographic unit, a magnetic unit, and an inclination unit, all of which are housed within a cylindrical barrel 11. In operating a device of this character it is necessary to delay the period of illumination until the instrument has been lowered to the zone of investigation. For that reason a timing structure is also necessary to control the circuit from a self-contained source of electric energy to the illumination unit. All of these structures are included within the barrel 11 as here shown.

A series of electric cells 19 are housed within the barrel 11. These batteries are suitably held in electrical contact by a spring 20 carried by a partition 21. The terminal of a conductor 22 is fastened to a contact button 22' mounted upon a washer 23 which may move longitudinally of a bore 24 in a coupling bushing 25. The coupling bushing 25 also carries a socket 26 which is mounted within the bore 24 to receive the base of an electric light bulb 27. The coupling bushing 25 is formed at its lower end with a recess 28 which provides a substantially parabolic reflector for the light rays from the electric light bulb 27, and tends to project the rays longitudinally so as to illuminate the compass card 57 as will be hereinafter described. The lower end of the bushing member 25 abuts against the upper end of a tubular liner 29, which upper end is formed with an inturned flange 30 providing an annular V-shaped groove into which the V-shaped edge of a spacing ring 31 fits. This spacing ring rests against the top face of a transparent disc 32. The disc 32 rests against a gasket 35' upon the upper edge of a spacing bushing 33 which is formed at its upper end with a recess 34 to receive a transparent bearing disc 35. The disc 32 and the gasket 35' act as a closure for the upper end of the bushing 33 and act as a cover for a fluid compartment 36 within which a transparent fluid of sufficient gravity to buoyantly support a compass assembly is placed as well as a guide for a compass mounting to be hereinafter described. The bottom of the bushing 33 is formed with a recess 37 which receives a transparent disc 38. A transparent disc 39 forms the bottom of the fluid compartment 36. The disc 39 is below the bushing 33. A washer 40 is interposed between the lower edge of the bushing 33, and the disc 39, thus sealing the compass and the fluid compartment. The disc 39 is held in position by a lock ring 41. The compass compartment 36 is partially filled with a transparent fluid. The drawing indicates that compartment 36 contains a quantity of fluid substantially equal to half of its capacity. Within this compartment is a float assembly 42. The float assembly 42 comprises a transparent float element 43 so that light from the light bulb 27 may pass directly through the float. This material is buoyant within the liquid used. The float is formed with a central passageway through it which comprises an intermediate cylindrical portion 44 and opposite conical counterbores 45. Within the intermediate cylindrical portion is a bushing 46 the wall of which is of triangular cross-section so that at the center of the bushing the smallest diameter of the opening occurs and thus the passageway through the float tapers outwardly toward both of its ends. This passageway accommodates a guide rod 47, the upper end of which is fitted with a shoulder 48 which is slidable within a bore 49 of the transparent disc 35. The lower end of this bore is reduced in diameter so that a shoulder is formed within the bore to accommodate a spring 50 which is interposed between the shoulder and the washer to normally hold the rod 47 taut, since the lower end of the rod is formed with an eye 51 by which it is fastened to a shackle bolt 52 extending through the disc 38. Thus it will be seen that the float unit 42 is yieldably guided along the longitudinal axis of the instrument and that as it swings to different inclinations with relation to the vertical there will not be any binding of the float upon the guide rod 47. The float as shown in Fig. 3 is formed with a pair of arcuate needles 53 and 54 which are secured in position upon the circumference of the float and at opposite sides thereof. These needles are held in place on the float by pins 55 extending into the float and between which the needles are positioned and are also held by the shell 55' which insures that the needles will be maintained in orientation upon the float. These needles lie within a circumferentially extending groove 56 around the body of the float. It will thus be seen that by this arrangement the entire central area of the float will be unobstructed by the compass needles and that there will be no objectionable shadows upon the photographic record which is made upon the photographic film to be hereinafter described. It is to be understood that while the compass is shown and described as floating it is within the contemplation of the inventor to use mechanical mountings for a magnetic compass if desired.

Mounted upon the under face of the float is a translucent screen 57. This screen carries the graduations as shown in Fig. 4 of the drawing. Below this translucent screen is a transparent washer 57' which is added by way of protection to the graduations on the screen. Below the sleeve 29 and within the barrel 11 is a light tube 58 at the lower end of which may be positioned a photographic lens not illustrated.

In operation of the present invention the structure is assembled as shown in Fig. 1 and may be thereafter placed within a suitable non-magnetic armored casing or bailer by which it is lowered into a well bore. It will be understood that in any event the instrument will be substantially longitudinally aligned with the wall of the well bore and that its parts will respond in such a manner as to indicate any deflection of the well bore from the vertical at the point where the reading is taken. The parts of the structure will be assembled as indicated in Fig. 1 of the drawing. Before the device is lowered into the well a time clock unit not illustrated is set after calculations have been made allowing sufficient time for the instrument to be lowered to a given depth in the well, and an additional amount of time during which the instrument is held in position prior to the taking of a reading. When the instrument reaches the desired position within the well the case of the device will assume an inclination in the event that the well bore at that point is not vertical, and the compass float 42 will maintain itself in a horizontally aligned position upon the surface of the fluid by which it is buoyantly supported. The compass 42 is free to rotate upon the guide member 47 so that the needles 53 and 54 of the compass may maintain the compass in proper relation to magnetic bearings irrespective of the rotated or inclined position of the entire instrument. Previous to the time that the instrument is placed in the well the photographic disc 75 is introduced into the lower end of the barrel. A circuit is completed through the timing device and the set of batteries 19 to the electric light globe 27. It is to be understood that although a wiring diagram has not been shown for the timing device, the batteries, and the electric globe that the drawing indicates one conductor leading to the socket of the light globe 27 from the batteries, and that the other pole of the batteries and the other terminal of the light globe are grounded to complete a conventional circuit. When the circuit is completed through the light globe 27 the light globe is illuminated and a beam of light will be projected downwardly through the various translucent and transparent members, including the compass 42 and the compass screen which it carries and upon which graduations occur representing magnetic bearing readings. The light will then pass through the float and the fluid within which it is suspended and will strike a lens where the image will be projected downwardly within the barrel of the instrument and through a transparent closure plate upon which concentric declination graduations occur. Attention is directed to the fact that the member 39 is provided at its center with a translucent spot 39'. This diffuses the light and obscures the dead light center of the compass so that this will not appear on the photograph. A photographic exposure may then be made on the photographic element 75 which will include a photographic image of the indicia on the card of the compass, making a composite record of data indicating declination and direction of the well bore.

It will thus be seen that the structure here disclosed embodies the advantage of being able to construct an instrument having an enclosing case of relatively small outside diameter as compared with other instruments now on the market, and within which it is possible to assemble the timing and battery units above the indicating and recording portions of the instrument so that space will not have to be provided along the sides of the instrument which would of necessity increase the diameter of the case, and so that a relatively large source of light may be used to directly and adequately illuminate the compass card and to create desired shadowgraphs and photographic images of the various indicating and calibrating elements of the instrument to produce an accurate and well defined record upon the photographic disc. It will also be evident that due to the construction here disclosed the instrument will be small and compact and of rugged design, and is not liable to get out of order when used.

While we have shown the preferred form of our invention, as now known to us, it will be understood that various changes might be made in the combination, construction, and arrangement of parts, by those skilled in the art, without departing from the spirit of the invention as claimed.

Having thus described our invention, what we claim and desire to secure by Letters Patent is:

1. A compass structure comprising a casing adapted to be located in a well bore, said casing having a float compartment containing a liquid, the opposite ends of said compartment being formed of light transmitting material, a float compass buoyantly supported upon the liquid in said compartment, said compass carrying indicating means thereon, and illuminating means adapted to project light through the compass compartment upon the indicating means whereby the indicating means interrupts the light.

2. A compass structure comprising a casing adapted to be located in a well bore, said casing having a float compartment containing a liquid, light transmitting ends therefor, a float buoyantly supported by said liquid, said float being made of light transmitting material, opaque graduations on the float whereby light projected through the compartment and the float will be interrupted by said graduations, and compass elements carried by said float to give it magnetic direction.

3. A compass structure comprising a casing adapted to be located in a well bore, said casing having a float compartment containing a liquid, light transmitting ends therefore, a float buoyantly supported by said liquid, said float being made of light transmitting material, opaque graduations on the float whereby a light projected through the float compartment and the float will be interrupted by said graduations, compass elements carried by said float to give it magnetic direction, and means extending through said float for centering the float longitudinally of the compartment while permitting it to be buoyantly supported.

JOHN C. HEWITT, JR.
V. EDWARD KUSTER.